United States Patent [19]

Stacy

[11] 4,172,182

[45] Oct. 23, 1979

[54] ENERGY CONVERSION DEVICES

[75] Inventor: Carl J. Stacy, Bartlesville, Okla.

[73] Assignee: Phillips Petroleum Company, Bartlesville, Okla.

[21] Appl. No.: 888,718

[22] Filed: Mar. 21, 1978

[51] Int. Cl.² .................................... H01M 6/20
[52] U.S. Cl. .............................. 429/104; 429/185
[58] Field of Search ............ 429/101, 102, 103, 104, 429/174, 185

[56] References Cited

U.S. PATENT DOCUMENTS

| | | | |
|---|---|---|---|
| 2,825,748 | 3/1958 | Coler | 136/83 |
| 3,078,329 | 2/1963 | Granger | 136/108 |
| 3,171,324 | 6/1965 | Iwai et al. | 136/153 |
| 3,354,129 | 11/1967 | Edmonds et al. | 260/79 |
| 3,404,036 | 10/1968 | Kummer et al. | 136/6 |
| 3,521,214 | 7/1970 | Bennet et al. | 338/322 |
| 3,743,543 | 7/1973 | Ciko et al. | 136/6 FS |
| 3,756,856 | 9/1973 | Tennenhouse | 429/104 |
| 3,764,392 | 10/1973 | Kuwazake et al. | 136/107 |
| 3,765,945 | 10/1973 | Sudworth | 136/83 R |
| 3,770,502 | 11/1973 | Nakabayashi | 136/6 FS |
| 3,852,114 | 12/1974 | Dubin | 136/83 T |
| 3,960,546 | 6/1976 | Rote et al. | 75/60 |

OTHER PUBLICATIONS

Journal of the Electrochemical Society, 124, No. 2, 236–237, Jun. 1975.
Journal of the Electrochemical Society, 124, No. 2, 236–237, Feb. 1977.
Short et al., Polyphenylene Sulfide Coating and Molding Resins, Aug. 1972, Chemtech, pp. 481–485.

*Primary Examiner*—Donald L. Walton

[57] ABSTRACT

Cured arylene sulfide polymers such as cured poly(phenylene sulfide) perform effectively in sealing or coating internal elements of alkali metal-sulfur energy conversion devices. The sealing or coating materials retain satisfactory corrosion resistance properties at elevated temperatures exceeding 300° C. and can be placed in contact with both molten alkali metal and molten sulfur. Adding carbon particles, carbon fibers, graphite, powdered metals or metal fibers renders the sealing or coating materials electrically conductive. Novel energy conversion device reactant containers and novel energy conversion devices are also disclosed.

34 Claims, 4 Drawing Figures

ENERGY CONVERSION DEVICES

The invention relates generally to energy conversion devices. In another aspect, the invention relates to a corrosion resistant conductive coating employed in energy conversion devices.

Recently developed sodium-sulfur energy conversion devices each comprise an ionically conductive ceramic electrolyte located between an alkali metal reactant in one chamber and a sulfurous reactant in another chamber. Both the alkali metal reactant and the sulfurous reactant are molten at typical operating temperatures of about 300° C. Considerable difficulties have been encountered in manufacturing such devices primarily because of the corrosive nature of the reactants at operating temperature.

It is therefore an object of this invention to provide an improved reactant container for energy conversion devices. Another object of this invention to provide a coating material which will protect the inner walls of an alkali metal-sulfur energy conversion device from corrosive attack by the reactants at the operating temperature of the device.

Another object of the invention is to provide an alkali metal-sulfur battery which is resistant to corrosive attack by the reactants thereof under operating temperatures of about 300° C.

Still another object of the invention is to provide an electrically conductive, corrosion resistant coating material for the inner surfaces of an alkali metal-sulfur energy conversion device capable of operating for extended periods of time in contact with at least one of the reactants at elevated operating temperatures.

In accordance with the present invention I have discovered that a reactant container for a reactant in an energy conversion device having an inner surface formed of a cured arylene sulfide polymer is capable of operating for extended time periods in contact with the reactant at elevated temperatures.

I have further discovered that a cured arylene sulfide polymer containing a conductive additive can be advantageously employed to coat the inner surfaces of a reactant container of an energy conversion device to protect the surfaces from corrosion at elevated operating temperatures and at the same time function as a conductor of electric current.

Further, according to the present invention, an energy conversion device having an ionically conductive member located between a sulfurous reactant in a first chamber and an alkali metal reactant in a second chamber is provided with a coating material of cured arylene sulfide polymer in at least one of the chambers capable of operating for extended time periods in contact with at least one of the reactants at elevated temperature.

In another embodiment of this invention, an energy conversion device is provided wherein an ionically conductive member is positioned between an alkali metal reactant in a first chamber and a sulfurous reactant in a second chamber. An arylene sulfide polymer coating material which, upon curing, is capable of operating for extended periods of time in contact with at least one of the reactants at elevated temperature is applied to the inner surface of the corresponding chamber to protect the surface of the chamber from corrosive attack by the reactant.

Various additives such as conductive carbon black, graphite, carbon fibers, powdered metals, metal fibers, metal-coated glass or ceramic spheres, and metal-coated glass fibers can be added to arylene sulfide polymer coating material to form an electrically conductive composition without adversely affecting the corrosive resistance to the reactants, thus rendering the composition useful as a coating for electrodes and the elements in contact therewith.

Other objects and advantages of the invention will be evident from the following detailed description and claims when read in conjunction with the accompanying drawings in which:

Figure 1:
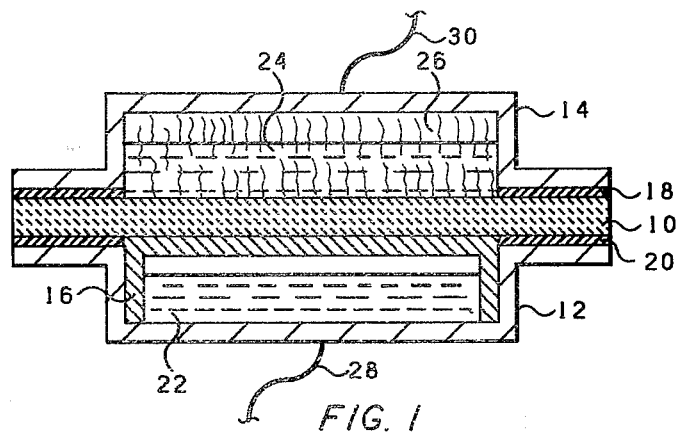
FIG. 1 is a vertical cross-sectional view of a disc-shaped sodium-sulfur energy conversion device showing the coating material of the invention when between the atmosphere and each of the reactants.
Figure 3:
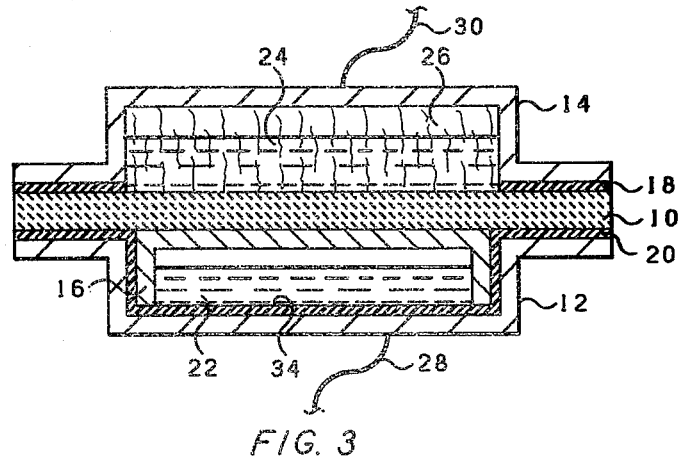
Figure 4:
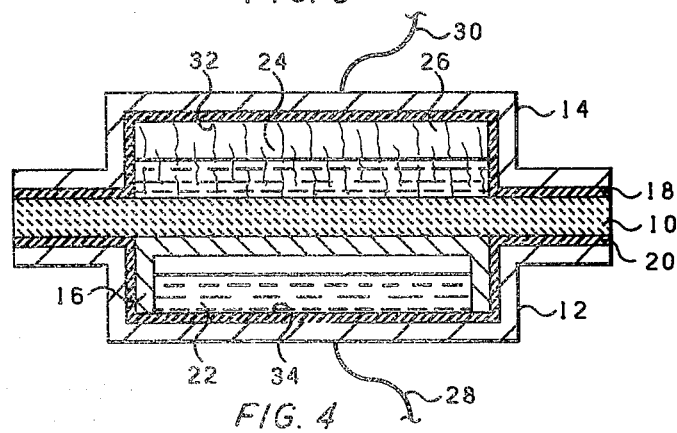

FIG. 3 is a cross-sectional view similar to FIG. 1 in which a seal coating of the coating material of the invention is applied to the entire inner surface of the container for the sodium reactant; and FIG. 4 is a cross-sectional view similar to FIG. 1 in which seal coatings of the coating material of the invention are applied to the entire inner surfaces of the containers for both the sodium reactant and the sulfurous reactant.

The reactant container of the present invention finds utility in energy conversion devices which employ one or more reactants which are damaging to conventional container structures formed of metal, glass or the like. Such energy conversion devices include alkali-metal batteries such as sodium-sulfur batteries. Various forms of sodium-sulfur battery structure are in common use. In general these structures comprise a first chamber containing a sulfurous reactant in the form of molten sulfur, sodium polysulfide or mixtures thereof and a second chamber containing molten sodium as the alkali metal reactant. The molten sodium is separated from the sulfurous reactant by an ionically conductive barrier. In one form, the ionically conductive barrier forms the second chamber containing the sodium and is positioned within a larger first chamber containing the sulfurous reactant with the sulfurous reactant contacting the exterior of the ionically conductive barrier. In this form of battery, cured arylene sulfide polymer can be advantageously employed as a corrosion resistant coating of the interior of the first chamber in contact with the molten sulfurous reactant. A cured arylene sulfide polymer having conductive additives blended therein permits the coating to function additionally as an electrode in the battery.

In other sodium sulfur battery configurations the second chamber containing the sodium is only partially formed of ionically conductive material and the remainder of the chamber can be advantageously protected from corrosive attack by the sodium on one side and the sulfurous reactant on the other side by a cured arylene sulfide polymer coating on each side. Again the addition of conductive additives to such coating compositions prior to curing permits the coatings to function as electrodes in the operation of the battery.

Thus it will be readily apparent that coatings formed from cured arylene sulfide polymer, both with and without conductive additives blended therewith, can be advantageously employed in the construction of energy conversion devices and are particularly advantageous when employed in alkali metal-sulfur energy conversion devices.

Applicable arylene sulfide polymers can be linear, branched, or lightly crosslinked. For example, the arylene sulfide polymers can be linear, branched, or lightly crosslinked biphenylylene sulfide polymers or, preferably, linear, branched, or lightly crosslinked phenylene sulfide polymers. If desired, the arylene sulfide polymer can be an arylene sulfide copolymer containing recurring arylene sulfide units of two or more different structures, or a blend of arylene sulfide polymers.

The process by which the arylene sulfide polymers for use in this invention are prepared is not critical. As examples, the arylene sulfide polymers can be produced from polyhalo aromatic compounds, alkali metal sulfides, and organic amides; from p-dihalobenzenes, alkali metal sulfides, organic amides, and alkali metal carboxylates; or from p-dihalobenzenes, polyhalo aromatic compounds having more than two halogen substituents per molecule, alkali metal sulfides, selected lithium salts, N-methyl-2-pyrrolidone, and alkali metal hydroxides. If desired, such polymers can be subjected to mild curing by heating to reduce the melt flow prior to use in the preparation of the seal members and coatings. Although the melt flow (ASTM D 1238-70, modified to a temperature of 316° C. using a 5-kilogram weight, value expressed as g/10 min.) of the arylene sulfide polymer for use in the production of the coating can vary over a wide range, generally it will be within the range of about 5 to about 10,000, preferably about 20 to about 8,000.

The composition of the coatings on containers 12 and 14 advantageously comprises an arylene sulfide polymer as described above, cured as shown below, and a conductive filler. The composition prior to curing as described below can be applied to a surface to be coated by a number of conventional methods. Examples of such suitable methods include electrostatic spraying or other form of powder spraying, fluidized bed techniques, or slurry techniques using a carrier liquid such as water, methyl alcohol, ethylene glycol, heptane, or the like. After removal of carrier liquid, if used, the coating composition on the substrate is heated at a temperature within the range of about 280° C. to about 450° C., preferably within the range of about 330° C. to about 400° C., for a time within the range of about 1 minute to about 5 hours, preferably within the range of about 15 minutes to about 2 hours, to cure the arylene sulfide polymer. If desired, multiple application and curing of the coating composition can be employed. Although the thickness of the resulting cured coating is not critical, generally it will be within the range of about 1 mil to about 20 mils. Therefore, the amount of the composition comprising arylene sulfide polymer and conductive filler applied to the substrate, as one or more coatings, preferably is such as to provide a final cured arylene sulfide polymer coating having a thickness within the range of about 1 mil to about 20 mils.

Suitable conductive materials for use as additives in the coating composition are materials having good resistance to liquid sodium, sulfur, and sodium polysulfide at temperatures up to about 450° C. Such materials include conductive particulate carbon black, carbon fibers, graphite, various finely divided metals such as powdered metals and metal fibers, metal-coated glass or ceramic spheres, and metal-coated glass fibers. Suitable powdered metals, metal fibers and metal coatings for glass or ceramic spheres or glass fibers for this application include Type 310 stainless steel, ferritic stainless steel, worthite, nickel, inconel, nichrome, monel, copper, beryllium copper, aluminum bronze, cupro and super nickel, tantalum, tungsten, chromium, 303 stainless steel, 304 stainless steel, 321 stainless steel and 347 stainless steel. Copper and copper alloys are not considered suitable metals for this application if the coating is to be in contact with lithium.

Suitable conductive coating compositions consist essentially of from about 95 to about 20 weight percent arylene sulfide polymer and about 5 to about 80 weight percent conductive additive blended therewith, and more preferably consist essentially of a blend of about 85 to about 40 weight percent arylene sulfide polymer and about 15 to about 60 weight percent conductive additive. Other additives, fillers, extenders and the like can also be blended in the coating compositions if desired.

Referring now to FIG. 1, which represents one presently preferred embodiment of an energy conversion device constructed in accordance with the present invention, a disc-shaped plate 10 of an ionically conductive solid ceramic electrolyte, such as β-alumina, is located between a cup-shaped lower container 12 and a cup-shaped upper container 14. Each of the containers 12 and 14 has a flange surrounding its opening. A cup-shaped member 16 made of porous metal has its base bearing against the lower surface of plate 10 and its sides depending downwardly therefrom.

A ring-shaped seal member 18 formed of cured arylene sulfide polymer is located at the junction of the flange of the upper container 14 with the upper surface of plate 10. A similar ring-shaped seal member 20 is located between the junction of the flange of the lower container 12 with the lower surface of plate 10. Container 12 is filled to a predetermined level with molten sodium 22 and container 14 is filled to a predetermined level with molten sulfur or sodium polysulfide or mixtures thereof as shown at 24. Porous metal member 16 utilizes capillary action to draw the molten sodium into contact with the lower surface of plate 10. Graphite felt 26 is located in container 14 in contact with the inner surface of the container 14.

Seal members 18 and 20, as well as the coatings to which reference is made hereinafter, are made from an arylene sulfide polymer which is fusible and which can be cured by heating to form a composition which is in the solid state at the temperature to which it is exposed in the operation of the battery and which is chemically stable to its environment during operation of the battery. The seal members 18 and 20 are preferably formed from partially cured arylene sulfide polymer film in the form of ring-shaped members which can be positioned as shown in FIG. 1 and cured by heating under pressure to achieve desired sealing between the containers 12 and 14 and the plate 10.

Alternatively, instead of use of a preformed ring of polymer, one or both of the surfaces separated by each of members 18 and 20 can be coated as described below for containers 12 and 14, at least a part of the curing of the polymer being conducted while the surfaces are pressed together with polymer therebetween in the fused state.

Containers 12 and 14 typically are made of stainless steel and the containers are attached to each other by some electrically insulative means (not shown) such as glass. Electrical leads 28 and 30 are connected to containers 12 and 14 respectively and to an exterior electrical circuit (not shown).

Figure 2:
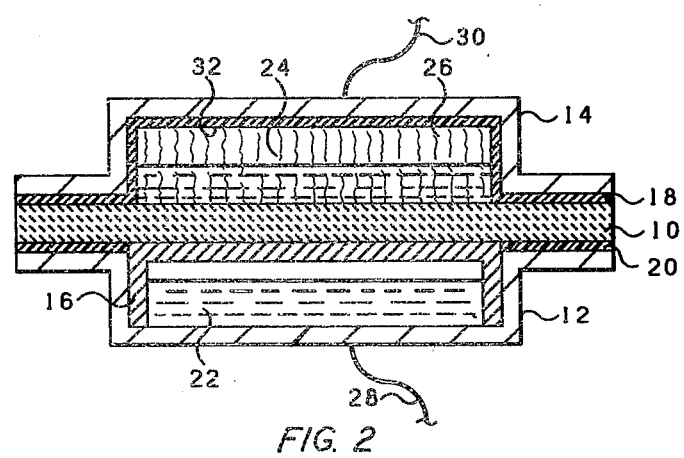
FIG. 2 is a cross-sectional view similar to FIG. 1 in which a seal coating of the coating material of the invention is applied to the entire inner surface of the container for the sulfurous reactant.

The energy conversion device construction shown in FIG. 2 is similar to that of FIG. 1 except that a coating 32 of cured arylene sulfide polymer covers the entire inner surface of the upper container 14. Coating 32 is made from an arylene sulfide polymer as described in detail above with the coating including a conductive member as also described in detail above. Graphite felt 26 is located in the interior of the container 14 and is in electrical contact with the inner surface of the coating 32.

The coating 32 conducts electrons from lead 30 and container 14 to and from the felt 26 but nevertheless retains sealing properties to protect the metal of container 14 from the corrosive nature of the sulfurous reactant within the container. As noted above, the coating 32 can be applied by various suitable methods which include electrostatic spraying or other form of powder spraying, fluidized bed techniques, or slurry techniques using a carrier liquid such as water, methyl alcohol, ethylene glycol, heptane, or the like and can then be cured by heating.

The energy conversion device construction shown in FIG. 3 is similar to that of FIG. 1 except that a coating 34 of cured arylene sulfide polymer seal material covers the entire inner surface of the lower container 12. Coating 34 is made from arylene sulfide polymer having a suitable conductive additive therein as described in detail above. The porous metal member 16 is located within the interior of the container 12 and is in electrical contact with the inner surface of the coating 34.

Coating 34 conducts electrons from lead 28 and container 12 to and from the porous metal member 16 but nevertheless retains sealing properties to protect the metal of container 12 from the corrosive nature of the liquid sodium reactant within the container 12. The coating 34 can be applied and cured in the same manner as described above for the coating 32.

The energy conversion device construction shown in FIG. 4 is similar to that of FIG. 1 except that a coating 32 of cured arylene sulfide polymer seal material covers the entire inner surface of the upper container 14 and a coating 34 of cured arylene sulfide polymer seal material covers the entire inner surface of the lower container 12. The coatings 32 and 34 are made from an arylene sulfide polymer mixed with a suitable conductive additive as described in detail above. Graphite felt 26 is located in the interior of container 14 and is in electrical contact with the inner surface of coating 32. Porous metal member 16 is located in the interior of lower container 12 and is in electrical contact with the inner surface of coating 34.

Coating 32 conducts electrons from lead 30 and container 14 to and from the graphite felt 26 but nevertheless retains sealing properties to protect the metal of container 14 from the corrosive nature of the sulfurous reactant within the container. Similarly, coating 34 conducts electrons from lead 28 and container 12 to and from the porous metal member 16 while retaining sealing properties to protect the metal of container 12 from the corrosive nature of the liquid sodium within the container 12.

Thus, in this embodiment as described the invention provides a versatile, strong coating and sealing material for energy conversion devices containing alkali metal and sulfurous reactants. The sealing and coating material remains corrosion resistant, thermally stable and infusible at battery operating temperatures in excess of 300° C. It will be understood that the invention will be equally applicable in energy conversion devices having configurations other than those specifically illustrated and described herein.

Changes can be made in the construction and arrangement of parts or elements of the various embodiments disclosed herein without departing from the spirit and scope of the invention as defined in the following claims.

What is claimed is:

1. An energy conversion device comprising:
   a quantity of reactant;
   a reactant container containing said quantity of reactant, said reactant container comprising a surface formed of a material comprising a cured arylene sulfide polymer capable of operating for extended time periods in contact with a reactant at elevated temperature.

2. An energy conversion device as defined in claim 1 wherein said material is characterized further to include a conductive additive.

3. An energy conversion device as defined in claim 2 wherein said conductive additive is carbon black.

4. An energy conversion device as defined in claim 1 wherein said reactant is molten sodium.

5. An energy conversion device as defined in claim 1 wherein said reactant is molten sulfur, sodium polysulfide or mixtures thereof.

6. An energy conversion device as defined in claim 1 wherein said arylene sulfide polymer is poly(phenylene sulfide) polymer.

7. An energy conversion device comprising:
   a quantity of reactant;
   a reactant container containing said quantity of reactant, said reactant container comprising a surface formed of a cured material comprising a blend of from about 20 to about 95 weight percent arylene sulfide polymer and from about 5 to about 80 weight percent conductive additive.

8. An energy conversion device as defined in claim 7 wherein said arylene sulfide polymer is poly(phenylene sulfide) polymer.

9. An energy conversion device as defined in claim 7 wherein said conductive additive is carbon black.

10. In an energy conversion device having an ionically conductive member located between a sulfurous reactant in a first chamber and an alkali metal reactant in a second chamber, a coating material capable of operating for extended time periods in contact with at least one of said reactants at elevated temperature, said coating material comprising a cured arylene sulfide polymer.

11. An energy conversion device as defined in claim 10 wherein said coating material contains at least one conductive additive.

12. An energy conversion device as defined in claim 11 wherein said conductive additive comprises particulate carbon.

13. An energy conversion device as defined in claim 11 wherein the alkali metal reactant is molten sodium and the coating material forms a barrier between the molten sodium and the walls of said second chamber.

14. An energy conversion device as defined in claim 11 wherein the sulfurous reactant is molten sulfur, sodium polysulfide or mixtures thereof and said coating material forms a barrier between the sulfurous reactant and the wall of said first chamber.

15. An energy conversion device comprising:
a first chamber having an inner surface;
a sulfurous reactant in said first chamber;
a second chamber having an inner surface;
an alkali metal reactant in said second chamber;
an ionically conductive member located between said first and second chambers in mutual electrical contact with said sulfurous reactant and said alkali metal reactant and separating said reactants one from the other; and
a coating material on the inner surface of at least one of said chambers and separating said inner surface from the corresponding reactant therein, said coating material being capable of operating for extended time periods in contact with said at least one of said reactants at elevated temperature and comprising a cured arylene sulfide polymer.

16. An energy conversion device as defined in claim 15 wherein said arylene sulfide polymer is an arylene sulfide copolymer containing recurring arylene sulfide units of at least two different structures.

17. An energy conversion device as defined in claim 15 wherein said arylene sulfide polymer is a blend of arylene sulfide polymers.

18. An energy conversion device as defined in claim 15 wherein said coating material is on the inner surface of said first chamber and separates said inner surface from said sulfurous reactant.

19. An energy conversion device as defined in claim 15 wherein said coating material is on the inner surface of said second chamber and separates said inner surface from said alkali metal reactant.

20. An energy conversion device as defined in claim 15 wherein said coating material contains a conductive additive.

21. An energy conversion device as defined in claim 20 wherein said conductive additive is particulate carbon.

22. An energy conversion device as defined in claim 20 wherein said conductive additive comprises finely divided metal.

23. An energy conversion device as defined in claim 15 wherein said alkali metal reactant is molten sodium.

24. An energy conversion device as defined in claim 15 wherein said sulfurous reactant is molten sulfur.

25. An energy conversion device as defined in claim 15 wherein the sulfurous reactant includes sodium polysulfide.

26. An energy conversion device as defined in claim 15 wherein the sulfurous reactant is molten sulfur, sodium polysulfide or mixtures thereof.

27. An energy conversion device as defined in claim 15 wherein said arylene sulfide polymer is poly(phenylene sulfide).

28. An energy conversion device as defined in claim 15 wherein said coating material contains a conductive additive and wherein said energy conversion device includes means in electrical contact with said coating material for conducting electrons to and from said coating material.

29. An energy conversion device as defined in claim 15 wherein said coating material is on the inner surface of said first chamber and separates said inner surface from said sulfurous reactant, wherein said coating material contains an electrically conductive additive, and wherein said energy conversion device includes means in electrical contact with said coating material for conducting electrons to and from said coating material.

30. An energy conversion device as defined in claim 15 wherein said coating material is on the inner surface of said second chamber and separates said inner surface from said alkali metal reactant, wherein said coating material contains an electrically conductive additive, and wherein said energy conversion device includes means in electrical contact with said coating material for conducting electrons to and from said coating material.

31. An energy conversion device as defined in claim 15 wherein a first portion of said coating material is on the inner surface of said first chamber and separates the inner surface of said first chamber from said sulfurous reactant, wherein said first portion of said coating material contains an electrically conductive additive, wherein said energy conversion device includes means in electrical contact with said first portion of said coating material for conducting electrons to and from said first portion of said coating material, wherein a second portion of said coating material is on the inner surface of said second chamber and separates the inner surface of said second chamber from said alkali metal reactant, wherein said second portion of said coating material contains an electrically conductive additive, and wherein said energy conversion device includes means in electrical contact with said second portion of said coating material for conducting electrons to and from said second portion of said coating material.

32. An energy conversion device as defined in claim 31 wherein said arylene sulfide polymer is poly(phenylene sulfide).

33. An energy conversion device as defined in claim 32 wherein said electrically conductive additive is particulate carbon.

34. An energy conversion device as defined in claim 15 wherein a first portion of said coating material is on the inner surface of said first chamber and separates the inner surface of said first chamber from said sulfurous reactant, and wherein a second portion of said coating material is on the inner surface of said second chamber and separates the inner surface of said second chamber from said alkali metal reactant.

* * * * *